United States Patent
Myohoji et al.

(10) Patent No.: US 9,663,135 B2
(45) Date of Patent: May 30, 2017

(54) STEERING SYSTEM

(71) Applicant: JTEKT Corporation, Osaka-shi, Osaka (JP)

(72) Inventors: Yu Myohoji, Habikino (JP); Masayoshi Sakuda, Kashihara (JP); Atsumune Nagatani, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/081,363

(22) Filed: Mar. 25, 2016

(65) Prior Publication Data

US 2016/0288817 A1    Oct. 6, 2016

(30) Foreign Application Priority Data

Mar. 31, 2015  (JP) ................................. 2015-072427

(51) Int. Cl.
*B62D 1/185*  (2006.01)
*B62D 1/184*  (2006.01)

(52) U.S. Cl.
CPC ............. *B62D 1/185* (2013.01); *B62D 1/184* (2013.01)

(58) Field of Classification Search
CPC ................................. B62D 1/184; B62D 1/185
See application file for complete search history.

(56) References Cited

U.S. PATENT DOCUMENTS

| 9,428,215 | B1 * | 8/2016 | Nagatani | B62D 1/195 |
| 2003/0209102 | A1 * | 11/2003 | Murakami | B62D 1/184 74/493 |
| 2008/0202276 | A1 * | 8/2008 | Harris | B62D 1/187 74/493 |
| 2010/0300238 | A1 | 12/2010 | Ridgway et al. | |
| 2011/0185839 | A1 | 8/2011 | Inoue | |
| 2014/0260762 | A1 | 9/2014 | Streng | |
| 2015/0266497 | A1 * | 9/2015 | Yoshihara | B62D 1/184 74/493 |
| 2015/0375770 | A1 * | 12/2015 | Buzzard | B62D 1/184 74/493 |
| 2016/0075367 | A1 * | 3/2016 | Sakuda | B62D 1/185 74/493 |

(Continued)

FOREIGN PATENT DOCUMENTS

JP    2010-254204 A    11/2010

OTHER PUBLICATIONS

Sep. 6, 2016 Search Report issued in European Patent Application No. 16162612.2.

*Primary Examiner* — James A English
(74) *Attorney, Agent, or Firm* — Oliff PLC

(57) ABSTRACT

When telescopic locking is released, a second tooth defining member interlocked with rotation of a clamping shaft via an interlocking mechanism (a driving member and a coupling shaft) acts to separate second teeth of the second tooth defining member from first teeth arranged in a column axial direction. At this time, the second teeth rotate in a circular-arc-like trajectory around a central axis of a support shaft, while the support shaft itself slides through a long groove formed in an outer jacket in the column axial direction. Thus, the movement trajectory of the second teeth during release of meshing engagement is in a direction approximately orthogonal to the column axial direction (the direction in which the first teeth are arranged).

2 Claims, 4 Drawing Sheets

(56) References Cited

U.S. PATENT DOCUMENTS

| | | | |
|---|---|---|---|
| 2016/0144886 A1* | 5/2016 | Tomiyama | B62D 1/187 74/493 |
| 2016/0214640 A1* | 7/2016 | Sakuda | B62D 1/184 |
| 2016/0264168 A1* | 9/2016 | Kubota | B62D 1/185 |
| 2016/0264169 A1* | 9/2016 | Kubota | B62D 1/195 |
| 2016/0264170 A1* | 9/2016 | Takahashi | B62D 1/195 |
| 2016/0288820 A1* | 10/2016 | Myohoji | B62D 1/195 |
| 2016/0288821 A1* | 10/2016 | Sakuda | B62D 1/185 |
| 2017/0029010 A1* | 2/2017 | Sakuda | B62D 1/195 |

* cited by examiner

STEERING SYSTEM

INCORPORATION BY REFERENCE

The disclosure of Japanese Patent Application No. 2015-072427 filed on Mar. 31, 2015 including the specification, drawings and abstract, is incorporated herein by reference in its entirety.

BACKGROUND OF THE INVENTION

1. Field of the Invention

The invention relates to a steering system.

2. Description of the Related Art

In a steering system in Japanese Patent Application Publication No. 2010-254204 (JP 2010-254204 A), a wavy recessed and protruding portion is formed on an outer periphery of an eccentric cam that rotates around a support shaft in conjunction with an operation of an adjustment lever. The wavy recessed and protruding portion is pressed against an upper surface of an inner column to achieve telescopic locking.

The inventors envisage that first teeth arranged on the inner column in an axial direction are brought into meshing engagement with second teeth that rotate around the support shaft and that the meshing engagement is released. The second teeth rotate in a circular-arc-like trajectory around the support shaft. Thus, when the meshing engagement with the first teeth is released, the second teeth are separated from the first teeth in a direction inclined with respect to a direction orthogonal to an aligning direction of the first teeth. This may hinder the second teeth from being separated from the first teeth, preventing easy release of the meshing engagement between the first teeth and the second teeth.

SUMMARY OF THE INVENTION

An object of the invention is to provide a steering system that facilitates release of meshing engagement.

According to an aspect of the invention, a steering system includes a steering shaft configured to contract and extend in a column axial direction, a column jacket including an outer jacket having a slit and a pair of clamped portions arranged on opposite sides of the slit and an inner jacket fitted in the outer jacket, the column jacket being configured to contract and extend in the column axial direction, a clamping mechanism including a clamping shaft supported in clamping shaft insertion holes in the clamped portions and an operation lever that rotates the clamping shaft, the clamping mechanism clamping the clamped portions via the clamping shaft to allow the outer jacket to hold the inner jacket, and a tooth locking mechanism that brings first teeth into meshing engagement with second teeth to achieve telescopic locking during clamping by the clamping mechanism. The tooth locking mechanism includes a first tooth defining member having the first teeth such that the first teeth are arranged in the column axial direction and moving together with the inner jacket, a support shaft supported in a long groove formed in the outer jacket or a member supported by the outer jacket and extending in the column axial direction such that the support shaft is slidable in the column axial direction, a second tooth defining member that has the second teeth and that is supported by the support shaft so as to be rotatable around a central axis of the support shaft, and an interlocking mechanism including a driving member that rotates together with the clamping shaft and a coupling shaft that couples the second tooth defining member and the driving member together such that the second tooth defining member and the driving member are rotatable and that is parallel to the clamping shaft, the interlocking mechanism interlocking rotation of the clamping shaft with rotation of the second tooth defining member.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 5A depicts a meshing engagement state, and FIG. 5B depicts a meshing engagement released state.

DETAILED DESCRIPTION OF EMBODIMENTS

Figure 1:
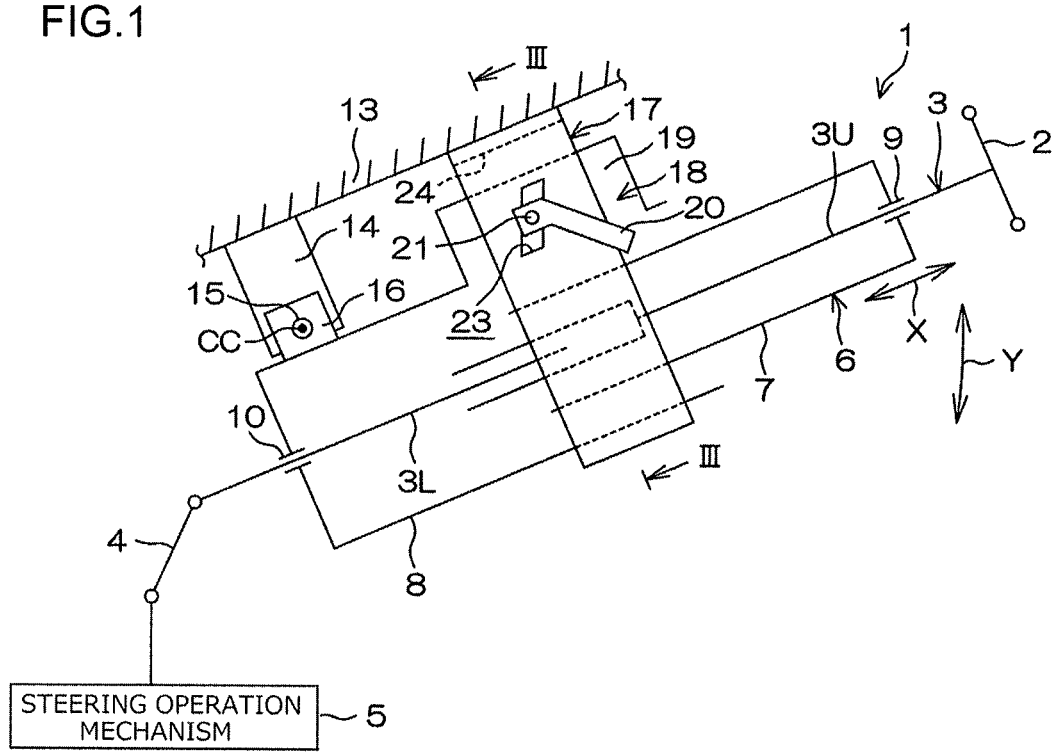
FIG. 1 is a schematic side view of a steering system in an embodiment of the invention.

An embodiment of the invention will be described below in detail with reference to the attached drawings. FIG. 1 is a schematic side view of a steering system 1 according to an embodiment of the invention. As seen in FIG. 1, the steering system 1 includes a steering shaft 3 and a steering operation mechanism 5. An end (axially upper end) of the steering shaft 3 is coupled to a steering member 2 such as a steering wheel. The steering operation mechanism 5 is coupled to the steering shaft 3 via an intermediate shaft 4 and the like.

The steering operation mechanism 5 is, for example, a rack-and-pinion mechanism that turns steered wheels (not depicted in the drawings) in conjunction with steering of the steering member 2. Rotation of the steering member 2 is transmitted to the steering operation mechanism 5 via the steering shaft 3, the intermediate shaft 4, and the like. The rotation transmitted to the steering operation mechanism 5 is converted into axial movement of a rack shaft not depicted in the drawings. Consequently, the steered wheels are turned.

The steering shaft 3 has a tubular upper shaft 3U and a tubular lower shaft 3L that are fitted together by, for example, spline fitting or serration fitting so as to be slidable relative to each other. The steering member 2 is coupled to an end of the upper shaft 3U. The steering shaft 3 can contract and extend in a column axial direction X. The steering system 1 includes a hollow column jacket 6 that supports the steering shaft 3 so as to make the steering shaft 3 rotatable. The column jacket 6 includes an upper jacket 7 and a lower jacket 8. The upper jacket 7 is a tubular inner jacket. The lower jacket 8 is a tubular outer jacket fitted over the upper jacket 7.

The steering shaft 3 is inserted into the column jacket 6 and rotatably supported by the column jacket 6 via a plurality of bearings 9 and 10. The upper jacket 7 is coupled to the upper shaft 3U via the bearing 9 so as to be movable in the column axial direction X in conjunction with the upper shaft 3U. The lower jacket 8 supports the lower shaft 3L via the bearing 10 so that the lower shaft 3L is rotatable. The upper jacket 7 moves in the column axial direction X with respect to the lower jacket 8. Consequently, the column jacket 6 can contract and extend in the column axial direction X along with the steering shaft 3.

The steering system 1 includes a fixed bracket 14, a tilt center shaft 15, and a column bracket 16. The fixed bracket 14 is fixed to a vehicle body 13. The tilt center shaft 15 is supported by the fixed bracket 14. The column bracket 16 is fixed to an outer periphery of the lower jacket 8 and rotatably supported by the tilt center shaft 15. The column jacket 6 and the steering shaft 3 can pivot (is tiltable) in a tilt direction Y using, as a support, a tilt center CC that is a central axis of the tilt center shaft 15.

The position of the steering member 2 can be adjusted by pivoting (tilting) the steering shaft 3 and the column jacket 6 around the tilt center CC (tilt adjustment). The position of the steering member 2 can be adjusted by contracting or extending the steering shaft 3 and the column jacket 6 in the column axial direction X (telescopic adjustment).

Figure 2:
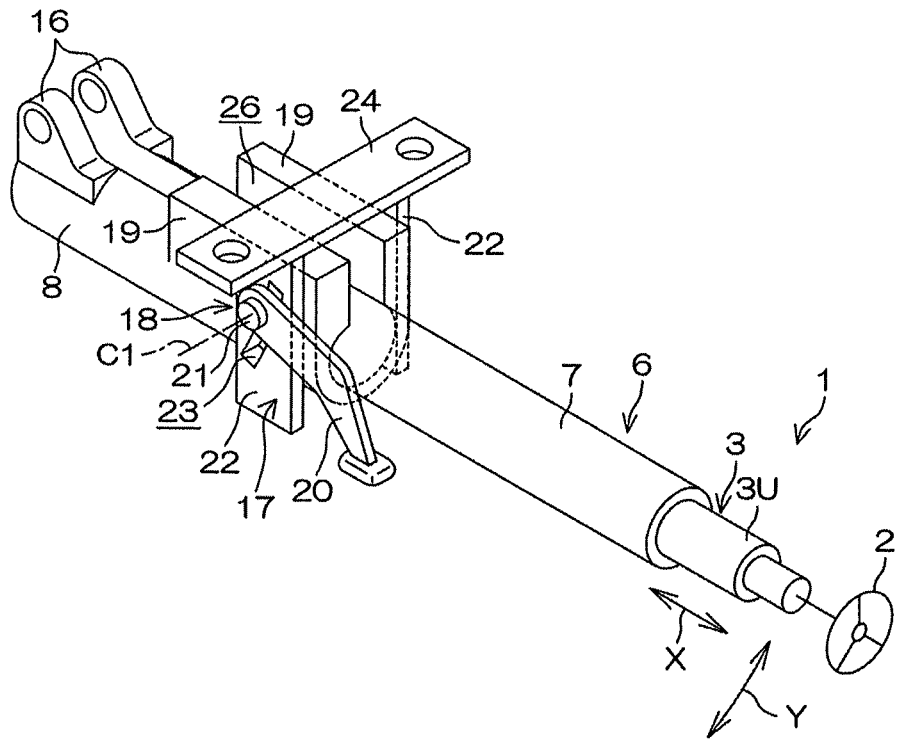
FIG. 2 is a schematic perspective view of the steering system.

The steering system 1 includes a bracket 17 and a clamping mechanism 18. The bracket 17 includes an attachment plate 24 fixed to the vehicle body 13. The clamping mechanism 18 achieves tilt locking and telescopic locking by clamping a pair of clamped portions 19 integrated with an upper portion of the lower jacket 8 in the column axial direction X. As depicted in FIG. 1 and FIG. 2 that is a schematic perspective view of the steering system 1, the clamping mechanism 18 includes a clamping shaft 21 and an operation lever 20. The clamping shaft 21 is inserted through tilting slots 23 in the bracket 17 to clamp the clamped portions 19. The operation lever 20 is an operation member that rotates the clamping shaft 21. A central axis C1 of the clamping shaft 21 corresponds to a center of rotation of the operation lever 20.

Figure 3:
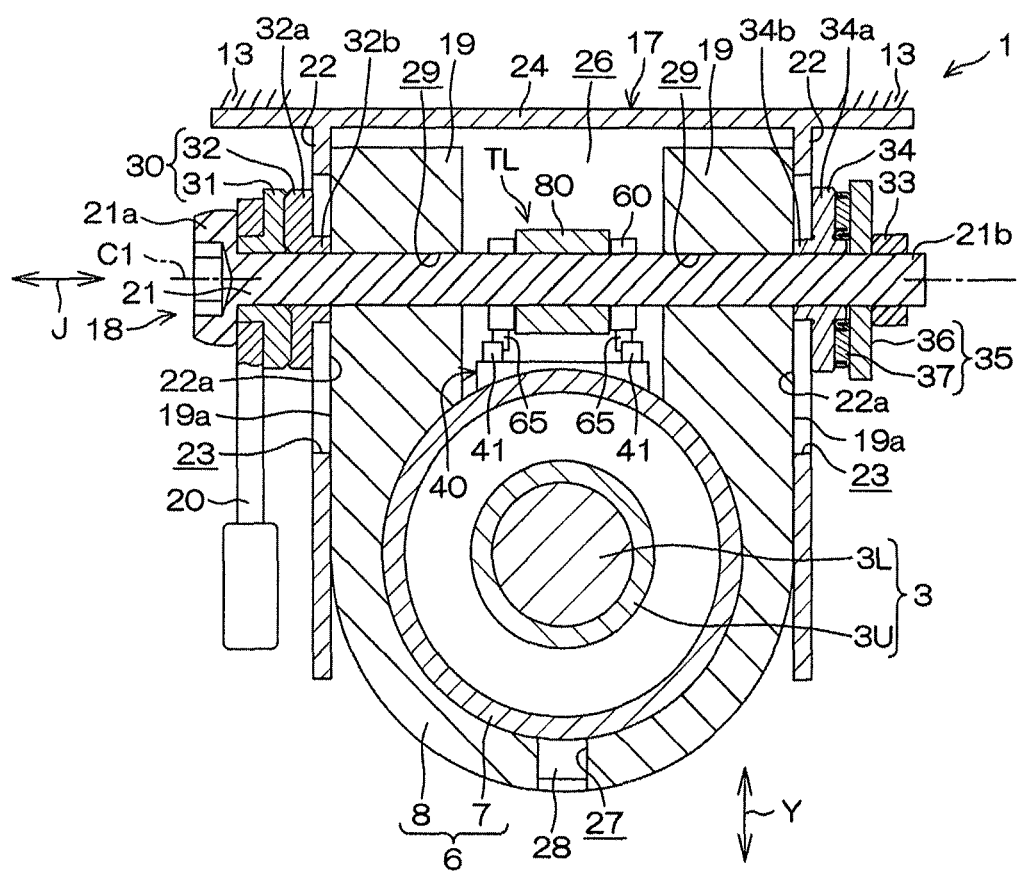
FIG. 3 is a sectional view of the steering system corresponding to a sectional view taken along line III-III in FIG. 1.

As depicted in FIG. 2, the lower jacket 8 includes a slit 26 extending downward from its upper end in the column axial direction X. The clamped portions 19 are arranged on opposite sides of the slit 26. Clamping the clamped portions 19 enables the lower jacket 8 to be elastically reduced in diameter. FIG. 3 is a sectional view taken along line III-III in FIG. 1. As depicted in FIG. 3, the bracket 17 includes the attachment plate 24 and a pair of side plates 22. The attachment plate 24 is attached to the vehicle body 13. The side plates 22 extend downward from the opposite ends of the attachment plate 24 in the tilt direction Y.

The lower jacket 8 has a guide groove 27 extending in the column axial direction X. A guided protrusion 28 fixed to the upper jacket 7 is fitted in the guide groove 27. The guide groove 27 allows axial movement of the upper jacket 7 to be guided and regulates rotation of the upper jacket 7 with respect to the lower jacket 8. An end (not depicted in the drawings) of the guide groove 27 in the column axial direction X comes into abutting contact with the guided protrusion 28. This prevents the upper jacket 7 from slipping out from the lower jacket 8.

The clamped portions 19 of the lower jacket 8 are arranged between the side plates 22 and shaped like plates each extending along an inner surface 22a of the corresponding side plate 22. The inner surfaces 22a of the side plates 22 each face an outer surface 19a of the corresponding clamped portion 19. In each of the clamped portions 19 of the lower jacket 8, a first insertion hole 29 is formed which is a circular hole through which the clamping shaft 21 is inserted. During tilt adjustment, the clamping shaft 21, the lower jacket 8, the upper jacket 7, and the steering shaft 3 move together in the tilt direction Y.

The clamping shaft 21 is a bolt inserted through the tilting slots 23 in the side plates 22 of the bracket 17 and through the first insertion holes 29 in the clamped portions 19 of the lower jacket 8. A large-diameter head portion 21a provided at one end of the clamping shaft 21 is fixed to the operation lever 20 so as to be rotatable together with the operation lever 20. The clamping mechanism 18 is interposed between the head portion 21a of the clamping shaft 21 and one of the side plates 22. The clamping mechanism 18 further includes a force conversion mechanism 30 that converts an operation torque of the operation lever 20 into an axial force of the clamping shaft 21 (a clamping force needed to clamp the side plates 22).

The force conversion mechanism 30 includes a rotation cam 31 and a first clamping member 32. The rotation cam 31 is coupled to the operation lever 20 so as to be rotatable together with the operation lever 20. Movement of the rotation cam 31 with respect to the clamping shaft 21 is regulated in a clamping shaft direction J that is a direction in which a central axial of the clamping shaft 21 extends. The first clamping member 32 is a non-rotation cam that cam-engages with the rotation cam 31 to clamp a corresponding one of the side plates 22. The clamping mechanism 18 further includes a nut 33, a second clamping member 34, and an interposition member 35. The nut 33 is screw-threaded on a threaded portion 21b of the other end of the clamping shaft 21. The second clamping member 34 clamps the other side plate 22. The interposition member 35 is interposed between the second clamping member 34 and the nut 33. The interposition member 35 includes a washer 36 and a needle roller bearing 37.

The second clamping member 34 and the interposition member 35 are interposed between the nut 33 and the other side plate 22 of the bracket 17. The rotation cam 31, the first clamping member 32 (non-rotation cam), the second clamping member 34, and the interposition member 35 are supported by an outer periphery of the clamping shaft 21. The first clamping member 32 (non-rotation cam) and the second clamping member 34 have clamping plate portions 32a and 34a, respectively, that clamp the corresponding side plates 22, and boss portions 32b and 34b, respectively, that are fitted in the corresponding tilting slots 23. The fitting between the boss portions 32b and 34b and the corresponding tilting slots 23 regulates rotation of the clamping members 32 and 34.

The first clamping member 32 (non-rotation cam) and the second clamping member 34 are supported by the clamping shaft 21 so as to be movable in the clamping shaft direction J. In conjunction with rotation of the operation lever 20 in a locking direction, the rotation cam 31 rotates with respect to the first clamping member 32 (non-rotation cam). Consequently, the first clamping member 32 is moved in the clamping shaft direction J to clamp the side plates 22 of the bracket 17 between (the clamping plate portions 32a and 34a of) the clamping members 32 and 34.

Thus, the side plates 22 of the bracket 17 clamp the corresponding clamped portions 19 of the lower jacket 8. As a result, movement of the lower jacket 8 in the tilt direction Y is regulated to achieve tilt locking. Both clamped portions 19 are clamped to elastically reduce the lower jacket 8 in diameter to clamp the upper jacket 7. Consequently, movement of the upper jacket 7 in the column axial direction X is regulated to achieve telescopic locking. As described above, the clamping mechanism 18 achieves telescopic locking based on friction between the jackets 7 and 8.

Figure 4:
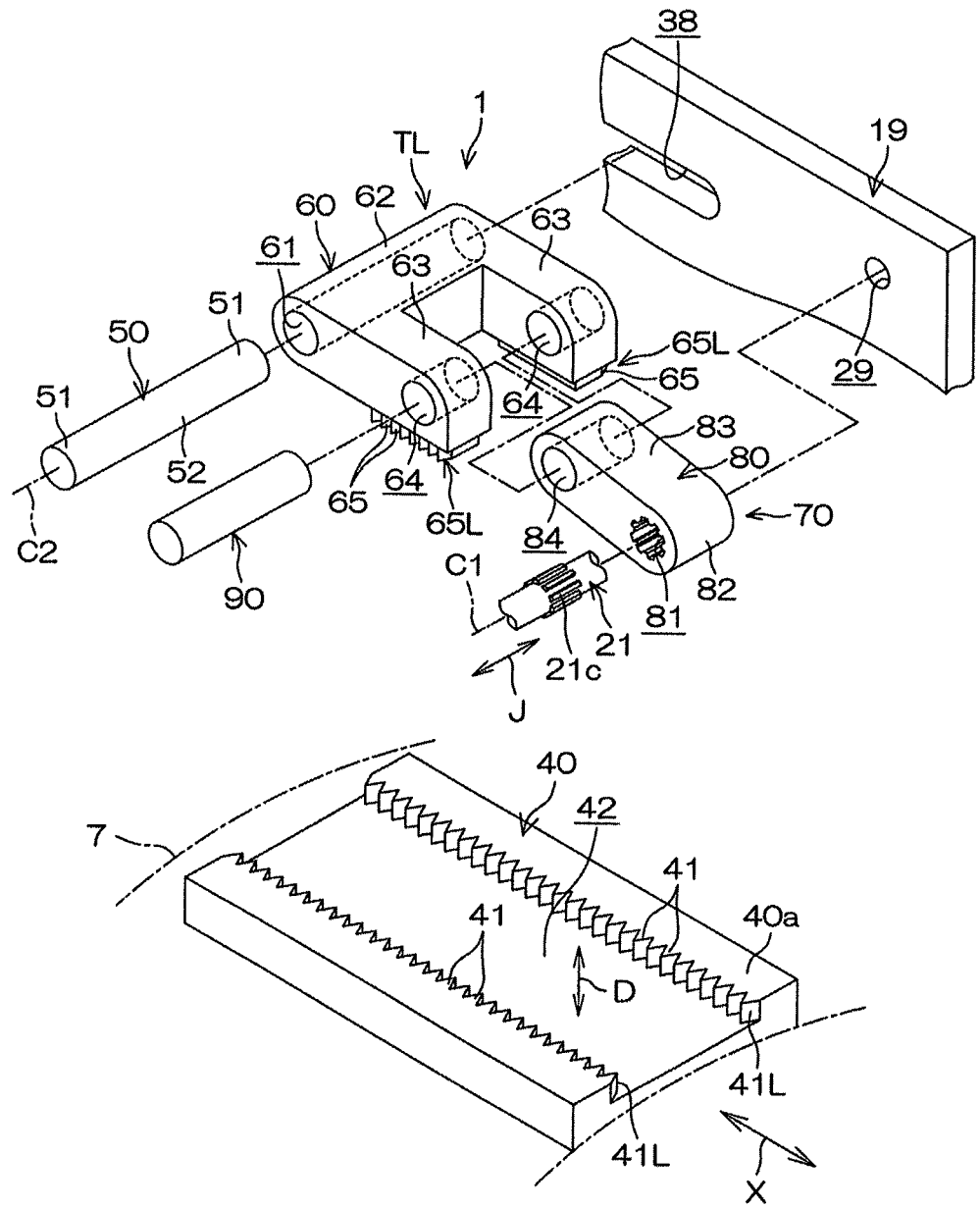
FIG. 4 is a schematic exploded perspective view of a tooth locking mechanism.
Figure 5A:
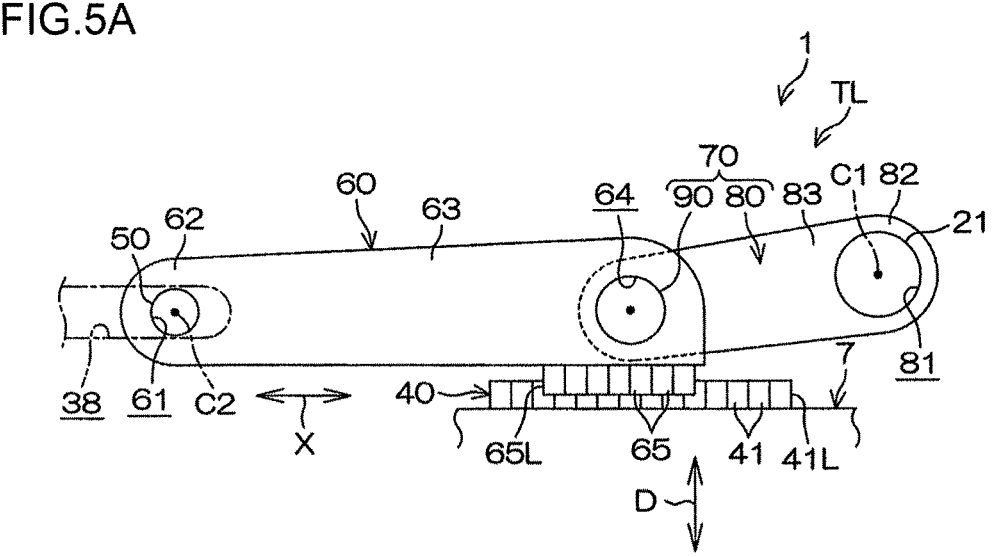
FIGS. 5A and 5B are schematic side views of the tooth locking mechanism.

As depicted in FIG. 4, the steering system 1 further includes a tooth locking mechanism TL that brings teeth into meshing engagement with one another during clamping by the clamping mechanism 18 in order to stabilize initial restraint in a telescopic direction at the time of a secondary collision (in other words, in order to hold a telescopic position for the upper jacket 7 in an initial stage of the secondary collision). As seen in FIG. 4 and FIG. 5A that is a schematic side view, the tooth locking mechanism TL includes a first tooth defining member 40, a support shaft 50, a second tooth defining member 60, and an interlocking mechanism 70. The first tooth defining member 40 has first teeth 41 and moves together with the upper jacket 7 in the column axial direction X. The support shaft 50 is supported by long grooves 38 in the lower jacket 8 that extend in the column axial direction X. The second tooth defining member 60 has second teeth 65 and is supported by the support shaft 50 so as to be rotatable around a central axis C2 of the support shaft 50. The interlocking mechanism 70 interlocks rotation of the clamping shaft 21 with rotation of the second tooth defining member 60.

As depicted in FIG. 4, the first tooth defining member 40 is formed using a plate material extending longitudinally in the column axial direction X and is fixed to an outer peripheral surface of the upper jacket 7 by welding or the like. A recessed groove 42 extending in the column axial direction X is formed in a surface 40a of the first tooth defining member 40. The recessed groove 42 has a pair of inner wall surfaces extending in the column axial direction X and facing each other in the clamping shaft direction J. On the inner wall surfaces, a pair of first tooth rows 41L is formed such that each of the first tooth rows 41L includes a plurality of first teeth 41 arranged in the column axial direction X.

Tooth tips of the first teeth 41 of one of the first tooth rows 41L face tooth tips of the first teeth 41 of the other first tooth row 41L in the clamping shaft direction J. A tooth trace direction D (corresponding to a tooth width direction) of the first teeth 41 extends in a depth direction of the recessed groove 42 so as to be orthogonal both to the column axial direction X and to the clamping shaft direction J. The first tooth defining member 40 may be fixed to an outer peripheral surface of the upper jacket 7 by bolts or the like not depicted in the drawings. The first tooth defining member 40 may be formed integrally with the upper jacket 7 using a single material.

A pair of ends 51 of the support shaft 50 is slidably supported in corresponding long grooves 38 in the lower jacket 8. The support shaft 50 is movable in the column axial direction X while being parallel to the clamping shaft 21. As depicted in FIG. 4 and FIG. 5A, the second tooth defining member 60 includes a base portion 62, a pair of arms 63, coupling holes 64, and second teeth 65. The base portion 62 has a fitting hole 61 in which an axially intermediate portion 52 of the support shaft 50 is fitted such that the base portion 62 is rotatable together with the support shaft 50. The arms 63 branch from the base portion 62 in a bifurcated manner and extend in a radial direction of the support shaft 50. The coupling holes 64 are formed at respective tip portions of the arms 63. The second teeth 65 are formed on each of the arms 63.

The second teeth 65 on the respective arms 63 form a pair of second tooth rows 65L each including a plurality of second teeth 65 arranged on a first tooth defining member 40-side surface of the corresponding arm 63 in a direction in which the corresponding arm 63 extends. As depicted in FIG. 4, tooth tips of the second teeth 65 of the two second tooth rows 65L face laterally outward in the opposite directions. The second teeth 65 of each of the second tooth rows 65L can come into meshing engagement with the first teeth 41 of the corresponding first tooth row 41L in the tooth trace direction D.

The first tooth rows 41L are arranged on opposite sides in the clamping shaft direction J. The tooth trace direction D is orthogonal to the column axial direction X and to the clamping shaft direction J. This allows suppression of possible tooth jump between the second teeth 65 and the first teeth 41 at the time of the secondary collision. As depicted in FIG. 4 and FIG. 5A, the interlocking mechanism 70 includes a driving member 80 and a coupling shaft 90. The driving member 80 rotates together with the clamping shaft 21. The coupling shaft 90 couples the second tooth defining member 60 and the driving member 80 together such that the second tooth defining member 60 and the driving member 80 are rotatable, and extends parallel to the clamping shaft 21.

The driving member 80 includes a base portion 82, an arm 83, and a coupling hole 84. The base portion 82 has a fitting hole 81 (spline hole) in which a spline portion 21c on an outer periphery of the clamping shaft 21 is spline-fitted such that the base portion 82 is rotatable together with the clamping shaft 21. The arm 83 extends from the base portion 82 in a radial direction of the clamping shaft 21. The coupling hole 84 is formed at a tip portion of the arm 83. The arm 83 of the driving member 80 is arranged between the arms 63 of the second tooth defining member 60. The coupling shaft 90 is inserted through the coupling holes 64 in the arms 63 of the second tooth defining member 60 and through the coupling hole 84 in the arm 83 of the driving member 80.

In the coupling hole 84 in the arm 83 of the driving member 80, a corresponding portion of a coupling shaft 90 is fitted. Through the coupling holes 64 in the arms 63 of the second tooth defining member 60, corresponding portions of the coupling shaft 90 are loosely arranged. Specifically, the coupling hole 64 is larger in diameter than the coupling shaft 90 by a predetermined amount. The operation lever 20 is rotated in the locking direction to rotate the driving member 80 counterclockwise along with the clamping shaft 21 from a state depicted in FIG. 5B to a state depicted in FIG. 5A. The second tooth defining member 60 coupled to the driving member 80 via the coupling shaft 90 is rotated clockwise around the central axis C2 of the support shaft 50. Consequently, the second teeth 65 come into meshing engagement with the first teeth 41 in the tooth trace direction D (see FIG. 5A). This achieves telescopic locking based on tooth locking.

At this time, the weight of the second tooth defining member 60 acts in a direction in which the second teeth 65 are brought into engagement with the first teeth 41. Although not depicted in the drawings, the second tooth defining member 60 or a member interlocked with the second tooth defining member 60 (for example, the driving member 80) may be provided with a bias member that constantly biases the second tooth defining member 60 in the direction in which the second tooth defining member 60 is brought into engagement with the first teeth 41. For example, in FIG. 5A, a bias member may be provided which rotationally biases the second tooth defining member 60 around the central axis C2 or a bias member may be provided which rotationally biases the driving member 80 around the central axis C1.

Figure 5B:
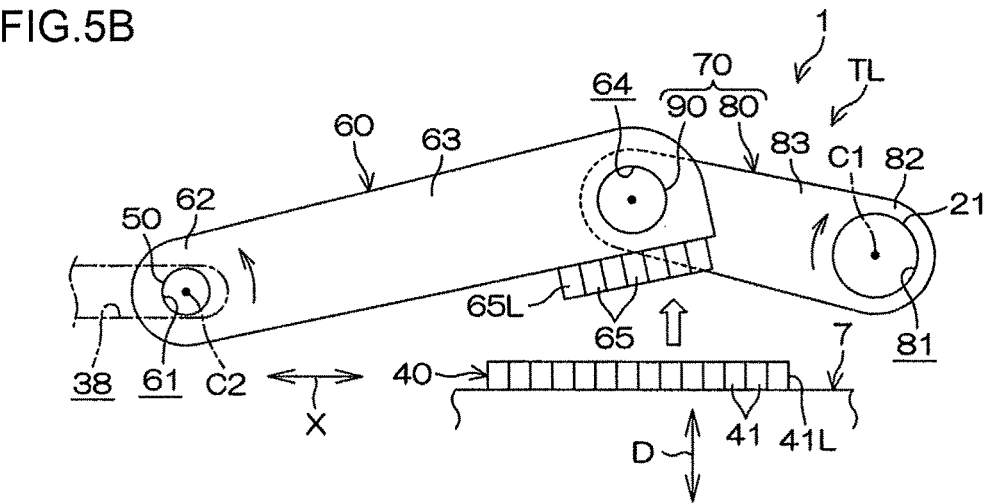

In contrast, the operation lever 20 is rotated in an unlocking direction to rotate the driving member 80 clockwise along with the clamping shaft 21 from the state depicted in FIG. 5A to the state depicted in FIG. 5B. The second tooth defining member 60 coupled to the driving member 80 via the coupling shaft 90 is rotated counterclockwise around the central axis C2 of the support shaft 50. Consequently, the second teeth 65 are separated from the first teeth 41 along the tooth trace direction D to release the meshing engagement (see FIG. 5B). This releases the telescopic locking based on tooth locking.

In the present embodiment, when the meshing engagement in the tooth locking mechanism in the meshing engagement state (telescopic locking state) depicted in FIG. 5A is released (telescopic locking is released), the second tooth defining member 60, which rotates in conjunction with rotation of the clamping shaft 21 via the interlocking mechanism 70, acts to separate the second teeth 65 from the first teeth 41 arranged in the column axial direction X. At this time, as depicted in FIG. 5B, the second teeth 65 rotate in a circular-arc-like trajectory around the central axis C2 of the support shaft 50, whereas the support shaft 50 itself slides through the long groove 38 formed in the lower jacket 8 toward the clamping shaft 21 in the column axial direction X (rightward in FIG. 5B).

Thus, the movement trajectory of the second teeth 65 during release of the meshing engagement is in a direction approximately orthogonal to the column axial direction X (the direction in which the first teeth 41 are arranged, and which is indicated by a blank arrow in FIG. 5B and corresponds to the tooth trace direction D of the first teeth 41). Therefore, the meshing engagement between the first teeth 41 and the second teeth 65 can be easily released. Through the coupling holes 64 in the arms 63 of the second tooth defining member 60, the corresponding portions of the coupling shaft 90 are loosely arranged. Therefore, during the release of the meshing engagement, movement of the support shaft 50 and the second tooth defining member 60 in the column axial direction X is permitted by the radial play between the coupling shaft 90 and the coupling holes 64 in the arms 63 of the second tooth defining member 60. The meshing engagement can be released as easily as possible.

The invention is not limited to the above-described embodiment. For example, the long groove 38 in which the support shaft 50 is supported may be formed in a member supported by the lower jacket 8 (not depicted in the drawings). The coupling holes 64 in the second tooth defining member 60 may be fitted over the coupling shaft 90. A radial play may be provided between the coupling shaft 90 and the coupling hole 84 in the driving member 80. The tooth trace direction D of the first teeth 41 and the second teeth 65 may be parallel to the clamping shaft direction J, and the first teeth 41 may be brought into meshing engagement with the second teeth 65 in a tooth depth direction and the meshing engagement may be released in the tooth depth direction. A single second tooth 65 may be provided in each arm 63.

Figure 6:
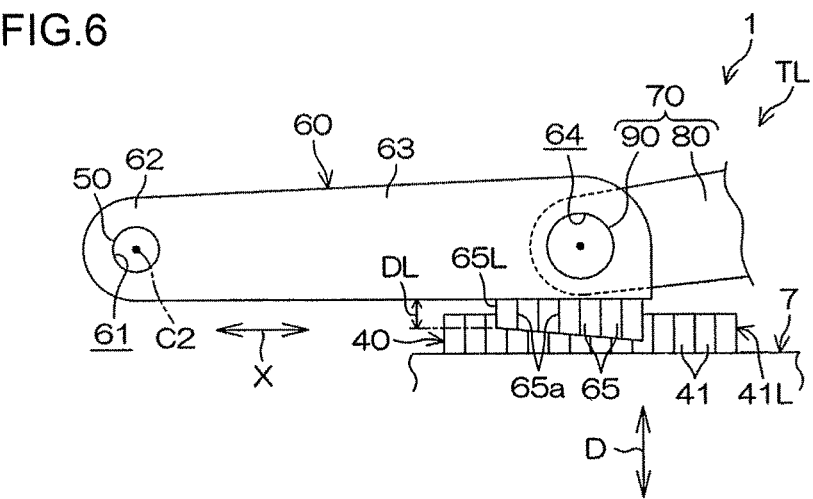
FIG. 6 is a schematic side view of a tooth locking mechanism in another embodiment of the invention.

The clamping mechanism 18, the slit 26, and the tooth locking mechanism TL may be arranged below the upper jacket 7 in the tilt direction Y. The coupling shaft 90 may be arranged above the clamping shaft 21 in the column axial direction X. The support shaft 50 may be arranged above the coupling shaft 90 in the column axial direction X. As depicted in FIG. 6, the second tooth rows 65L of the second tooth defining member 60 may be inclined in a side view. A length DL of tooth traces 65a of the second teeth 65 (corresponding to the tooth width) may increase toward a tip of the second tooth defining member 60 (toward the side opposite to the support shaft 50). In this case, when the second teeth 65 of the second tooth rows 65L are separated from the first teeth 41 to release the meshing engagement, the second teeth 65 are sequentially separated starting with the second tooth 65 closest to the support shaft 50 to release the meshing engagement. This facilitates the separation so that separation performance is enhanced. In contrast, when the second teeth 65 are brought into meshing engagement with the first teeth 41, the meshing engagement is sequentially performed starting with the second teeth 65 of each of the second tooth rows 65L that is closest to the tip of the second tooth defining member 60. This facilitates the meshing engagement so that meshing engagement performance is enhanced.

The steering system 1 is not limited to the manual type steering system and may be an electric power steering system that applies mechanical power of an electric motor to the steering shaft 3 to assist steering. Furthermore, various changes may be made to the invention within the scope of the invention recited in the claims.

What is claimed is:

1. A steering system comprising:
   a steering shaft configured to contract and extend in a column axial direction;
   a column jacket including an outer jacket having a slit and a pair of clamped portions arranged on opposite sides of the slit and an inner jacket fitted in the outer jacket, the column jacket being configured to contract and extend in the column axial direction;
   a clamping mechanism including a clamping shaft supported in clamping shaft insertion holes in the clamped portions and an operation lever that rotates the clamping shaft, the clamping mechanism clamping the clamped portions via the clamping shaft to allow the outer jacket to hold the inner jacket; and
   a tooth locking mechanism that brings first teeth into meshing engagement with second teeth to achieve telescopic locking during clamping by the clamping mechanism, wherein
   the tooth locking mechanism includes:
   a first tooth defining member having the first teeth such that the first teeth are arranged in the column axial direction and moving together with the inner jacket;
   a support shaft supported in a long groove formed in the outer jacket or a member supported by the outer jacket and extending in the column axial direction such that the support shaft is slidable in the column axial direction;
   a second tooth defining member that has the second teeth and that is supported by the support shaft so as to be rotatable around a central axis of the support shaft; and
   an interlocking mechanism including a driving member that rotates together with the clamping shaft and a coupling shaft that couples the second tooth defining member and the driving member together such that the second tooth defining member and the driving member are rotatable and that is parallel to the clamping shaft, the interlocking mechanism interlocking rotation of the clamping shaft with rotation of the second tooth defining member.

2. The steering system according to claim 1, wherein the second tooth defining member and the driving member each include a coupling hole through which the coupling shaft is inserted, and
   a radial play is provided between the coupling shaft and the coupling hole in one of the second tooth defining member and the driving member.

* * * * *